Aug. 26, 1930.  G. S. LOY  1,774,487
PROCESS OF AND SELF REGULATING PLANT FOR THE MECHANICAL PREPARATION
OF PULVERIZED SOLID FUELS AND LIKE MATERIALS
Filed Dec. 1, 1928  4 Sheets-Sheet 1

George Sylvin Loy
INVENTOR

Aug. 26, 1930.  G. S. LOY  1,774,487
PROCESS OF AND SELF REGULATING PLANT FOR THE MECHANICAL PREPARATION
OF PULVERIZED SOLID FUELS AND LIKE MATERIALS
Filed Dec. 1, 1928  4 Sheets-Sheet 4

George Sylvin Loy
INVENTOR;
By
his Attorney.

Patented Aug. 26, 1930

1,774,487

UNITED STATES PATENT OFFICE

GEORGE SYLVIN LOY, OF PARIS, FRANCE

PROCESS OF AND SELF-REGULATING PLANT FOR THE MECHANICAL PREPARATION OF PULVERIZED SOLID FUELS AND LIKE MATERIALS

Application filed December 1, 1928, Serial No. 323,059, and in France December 9, 1927.

My invention relates to a process and a self-regulating plant or apparatus for the preparation of pulverized solid fuel.

The primary object of my invention is to so control the travel of the fuel to be treated that clogging or overloading the pulverizer is prevented, whereby the mechanical power required for driving the pulverizer will be made more uniform, thus allowing to use a much less powerful motor. Another object is to do away with the storage hoppers or similar containers usually required to store coal between the drying machine and the crusher or pulverizer and to collect the sufficiently fine dust after sorting and before feeding said dust to the burners, which storages are cumbersome and are liable to cause fires owing to the high inflammability of the coal dust.

A further object is to provide a combined apparatus of small bulk with which the aforesaid objects will be attained and which may be easily applied on steamers.

With these and other objects in view as will appear from the following description, my invention resides in the peculiar combination of operations and arrangement and connection of parts or devices as will be hereafter set forth and more fully pointed out in the claims.

One preferred embodiment of my invention is shown in the annexed drawing in which.

Figure 1:
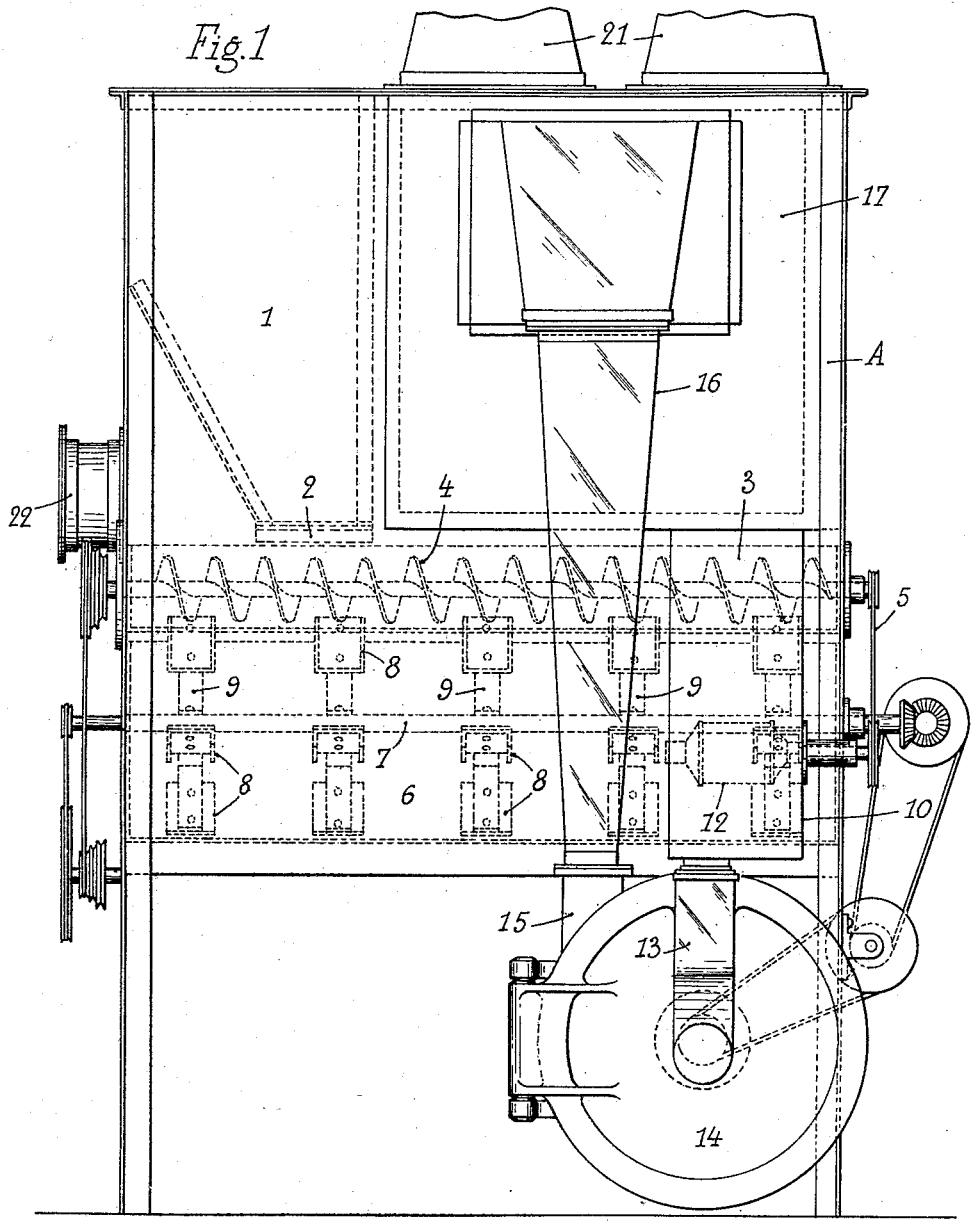
Fig. 1 is a front view of the apparatus according to the invention.
Figure 2:
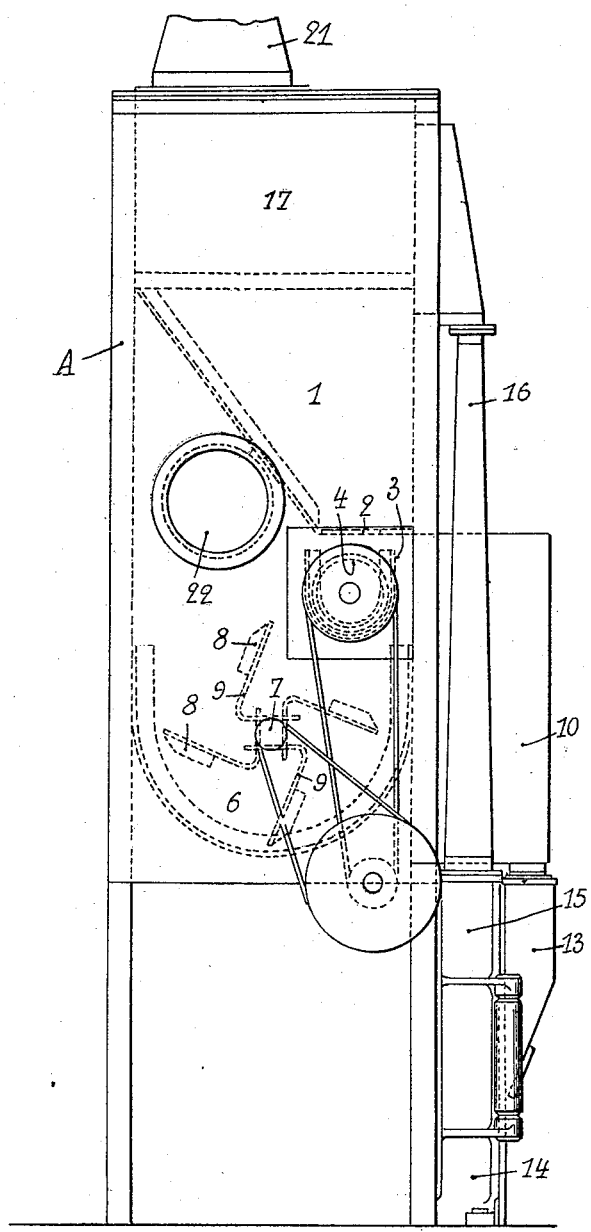
Figs. 2 and 3 are corresponding side views.

In the form of construction herein represented, A is the outer casing of the apparatus, at the upper part of which is disposed a loading hopper 1, whose lower end 2 communicates with a semicircular trough 3 disposed upon the whole length of the casing A. In the interior of the trough 3 is mounted a screw conveyor 4, which is rotated by any suitable source of power, such as an electric motor or the like, by means of a driving gear 5.

Figure 4:
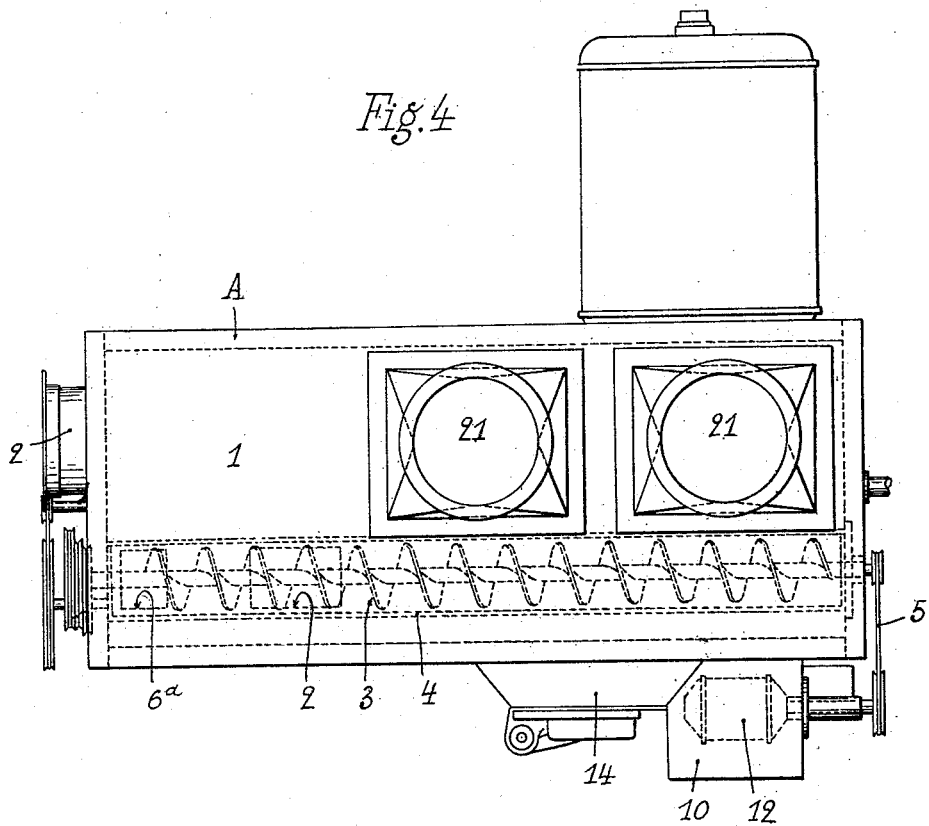
Fig. 4 is a plan view corresponding to Fig 1.

As shown in Figs. 1 and 4, the said trough 3 communicates at its lower portion at 6ª, and adjacent the hopper 1, with a dryer 6 which is traversed upon its whole length by an horizontal shaft 7 to which are secured paddles 8 adapted to stir up the material delivered from the said conveyor 4, and to transport it in the said dryer. The paddles are placed on the supports or brackets 9 whose inclination is variable and can be regulated according to the nature of the material. At the other end from the intake of the material, the dryer 6 communicates with a chamber 10, in which is mounted a rotatable magnetic drum 12, upon which is delivered the stirred and dried material from the said dryer. The said magnetic drum is disposed above a spout 13 which leads the material from the drum into the central part of a pulverizer 14 of any known type. The material which is ground up in the said pulverizer issues through a vertical conduit 15, at whose end is a divergent tube 16 communicating at its upper end with a sorting and separating device, or separator, 17.

Figure 3:
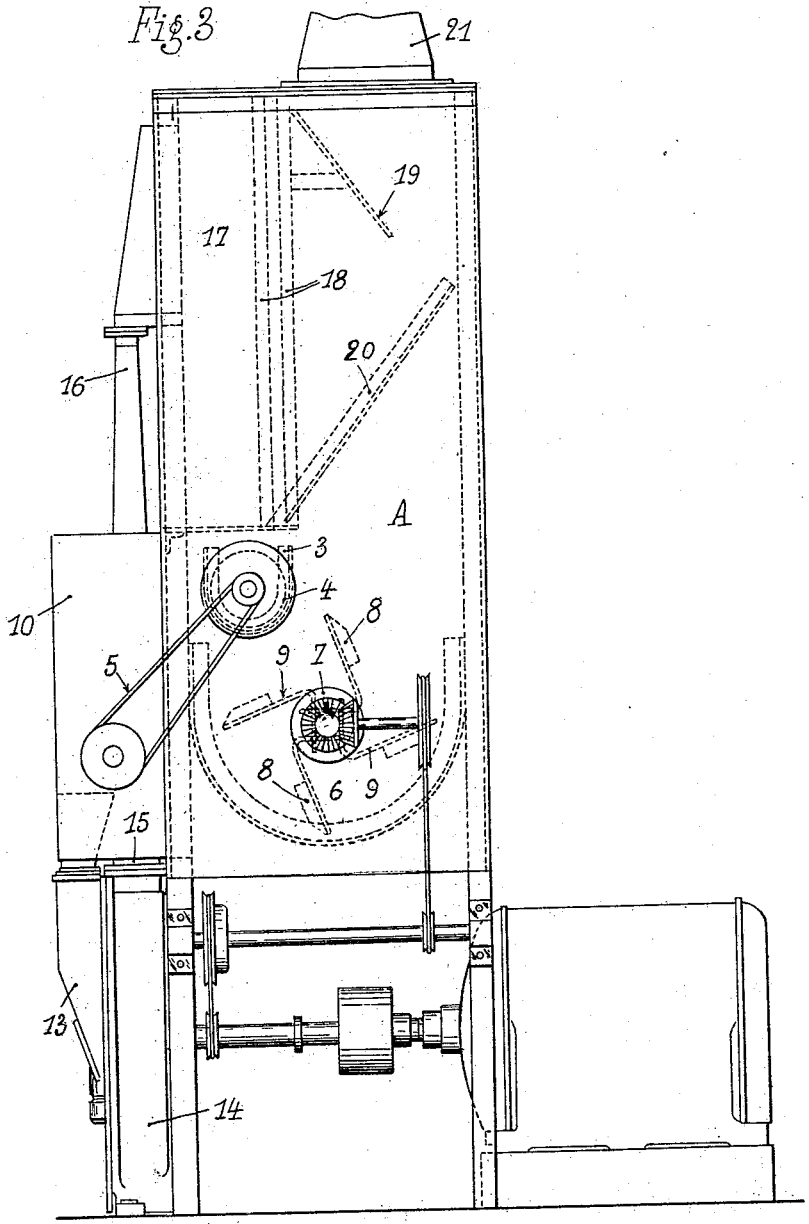

The said separator (Figure 3) comprises separating screens 18 and two sets of baffle sieves 19 and 20. The screens 18 allow only the fine enough particles to pass beyond. As herein represented, the separator communicates at the bottom with the trough 3 and consequently with the conveyor 4, for purposes which will be more clearly stated with reference to the operation of the apparatus. The finest products separated in the said separator are withdrawn by a distributing blower or fan, not shown, into conduits 21 conducting the said products to the place of use.

The circulation of the hot gas in the dryer 6 takes place in the contrary direction to the travel of the material to be treated in the dryer. The hot air is supplied by distributing blowers, and it is delivered through a suitable conduit into the apparatus.

The said apparatus, which provides for the treatment of fuels such as coal and the like, is operated in the following manner.

The raw coal which is loaded into the hopper 1, drops through the opening 2 into the trough 3 and is then taken up by the conveyor screw 4 and is delivered into dryer 6 in which it is stirred up and is delivered by the said paddles 8 to the magnetic drum 12 which retains any magnetic particles which may be mixed with the coal. This latter will then drop into the pulverizer 14, and when thus powdered, it is drawn into the separator 17. The suction from the said fans will supply air to the said separator, thus drawing off the cloud of fuel dust whose degree of fineness may be regulated by two factors, that is the amount of suction and the input of the air. In this manner, the sufficiently fine particles of material will pass through and around the baffle sieve 19 into the conduit 21, and the particles which are too large and cannot pass through the screens 18 will drop back into the conveyor 4.

In this apparatus, the very large pieces are taken up by the conveyor before it receives fresh material supplied by the hopper 1, so that the quantity of fresh material handled varies inversely with the quantity of the very large or untreated pieces and with the amount of material consumed. This offers a great advantage, chiefly in the case of coal, since it provides for the total use and recovery of the coal.

Obviously, the said invention is not limited to the form of construction herein represented, which is given solely by way of example.

Having now described my invention, what I claim as new and desire to secure by Letters Patent is:

1. In a plant for the preparation of pulverized coal, in combination, a pulverizer connected to a classifying separator, means for continuously feeding said pulverizer, said feeding means having a constant output and means for leading the oversize coming from the separator back into said feeding means before the latter becomes loaded with raw fuel.

2. In a plant for the preparation of pulverized coal, in combination, a dryer connected to a pulverizer, a separator connected to said pulverizer and means for leading back into the dryer the oversize coming from the separator.

3. In a plant for the preparation of pulverized coal, in combination, a dryer connected to a pulverizer, a separator connected to said pulverizer, means for continuously feeding said dryer, said means having a constant output and means for leading back the oversize coming from the separator into said feeding means before the latter becomes loaded with raw fuel.

4. In a plant for the preparation of pulverized coal, in combination, a dryer connected to a pulverizer, a separator, means for continuously feeding said dryer, said feeding means having a constant output, said separator including a chamber, at least a screen dividing said chamber into two compartments, a conduit between one of said compartments and separating means adapted to feed the consumption elements, a conduit between the other compartment and the pulverizer, means for leading into said last mentioned compartment the material discharged from the pulverizer, and means for leading the material which has not passed through the screen back to said feeding means before the latter becomes loaded with raw fuel.

5. A plant for the preparation of pulverized coal comprising in combination a closed box-like casing, a transverse partition defining at the upper part of said casing two compartments whereof one is used as feeding hopper for the raw fuel and the other as separator, both compartments opening into a common longitudinal screw conveyor adapted to discharge the material at one end of the lower portion of said box adapted to be used as a dryer, a pulverizer connected to the opposite end of said lower portion, means within said dryer to propel the material into said pulverizer, a screen within the separator compartment and defining therein two sub-compartments, means connecting the outlet of said pulverizer to one of said sub-compartments, a partition separating the dryer from the other sub-compartment and means connecting the latter to sucking means adapted to feed the consumption elements.

6. In a process for the preparation of pulverized coal the steps consisting in keeping on circulating a given amount of coal to be treated according to an endless circuit and without storage or stopping, in successively subjecting to pulverization and sorting the coal during its travel through the circuit, in withdrawing from said circuit sufficiently fine coal particles and in feeding said circuit with an amount of raw fuel automatically equal to the amount of dust withdrawn therefrom.

7. In a process for the preparation of pulverized coal the steps consisting in keeping on circulating a given amount of coal to be treated according to an endless circuit and without storage or stopping, in successively subjecting to pulverization and sorting the coal during its travel through the circuit, in withdrawing from said circuit a variable amount of the sufficiently fine coal particles in dependance on the actual consumption requirements and in feeding said circuit with an amount of raw fuel automatically equal to the amount of dust withdrawn therefrom.

8. In a process for the preparation of pulverized coal the steps consisting in keeping on circulating a given amount of coal to be treated according to an endless circuit and without storage or stopping, in successively subjecting to drying pulverization and sorting the coal during its travel through the circuit, in withdrawing from said circuit sufficiently fine coal particles and in feeding said circuit with an amount of raw fuel automatically equal to the amount of dust withdrawn therefrom.

9. In a process for the preparation of pulverized coal the steps consisting in keeping on circulating a given amount of coal to be treated according to an endless circuit and without storage or stopping, in successively subjecting to pulverization and sorting the coal during its travel through the circuit, in withdrawing from said circuit sufficiently fine coal particles and in feeding said circuit with an amount of raw fuel automatically equal to the amount of dust withdrawn therefrom and in feeding directly said withdrawn particles without storage or stopping to the consumption elements.

10. In a process for the preparation of pulverized coal the steps consisting in keeping on circulating according to an endless circuit and without storage or stopping a given amount of coal, in successively subjecting the coal to pulverization and sorting during its travel through the circuit, in withdrawing from said circuit by suction sufficiently fine coal particles, the intensity of said suction being made automatically dependent upon the actual consumption requirements and in feeding said circuit with an amount of raw fuel automatically equal to the amount of dust withdrawn therefrom.

In testimony whereof I have signed my name to this specification.

GEORGE SYLVIN LOY.